United States Patent
Bannai

(10) Patent No.: US 7,532,224 B2
(45) Date of Patent: May 12, 2009

(54) INFORMATION PROCESSING METHOD AND APPARATUS

(75) Inventor: Yuichi Bannai, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 11/400,480

(22) Filed: Apr. 7, 2006

(65) Prior Publication Data

US 2006/0227151 A1    Oct. 12, 2006

(30) Foreign Application Priority Data

Apr. 8, 2005    (JP)    ............................. 2005-112108

(51) Int. Cl.
| | |
|---|---|
| G09G 5/00 | (2006.01) |
| G06T 15/10 | (2006.01) |
| G06T 15/20 | (2006.01) |
| G06T 17/40 | (2006.01) |
| G06F 3/00 | (2006.01) |
| G06F 15/20 | (2006.01) |
| A63F 13/00 | (2006.01) |

(52) U.S. Cl. ....................... 345/633; 345/619; 345/630; 345/7; 345/156; 348/42; 348/51; 348/563; 348/739; 359/458; 359/462; 382/154; 382/291; 382/295

(58) Field of Classification Search ................ 345/156, 345/632–633, 418–419, 427, 581, 7–9, 589–591, 345/619–625, 629–630, 649–666; 348/42, 348/47–51, 115, 142, 159, 169, 174, 584, 348/563–565, 722, 739; 359/242, 458, 462, 359/466

See application file for complete search history.

(56) References Cited

U.S. PATENT DOCUMENTS

| | | | | |
|---|---|---|---|---|
| 6,522,312 | B2 * | 2/2003 | Ohshima et al. | ................ 345/8 |
| 6,570,566 | B1 * | 5/2003 | Yoshigahara | ................ 345/427 |
| 6,694,194 | B2 | 2/2004 | Oda et al. | |
| 6,822,643 | B2 * | 11/2004 | Matsui et al. | ................ 345/204 |
| 7,292,240 | B2 * | 11/2007 | Okuno et al. | ................ 345/419 |
| 2002/0084974 | A1 * | 7/2002 | Ohshima et al. | ............ 345/156 |
| 2004/0019009 | A1 * | 1/2004 | Bennett et al. | ................ 514/44 |
| 2004/0021664 | A1 * | 2/2004 | Takemoto et al. | ............ 345/419 |

(Continued)

FOREIGN PATENT DOCUMENTS

EP    1060772 A2    12/2000

(Continued)

*Primary Examiner*—Wesner Sajous
(74) *Attorney, Agent, or Firm*—Canon U.S.A. Inc., I.P. Division

(57) ABSTRACT

An information processing method and apparatus enables one or more further users to share a mixed reality space image including a virtual object superimposed in a space where a first user exists. A first stereo image is acquired based on a stereo video captured by a first stereo capturing section mounted on the first user and a virtual object image created based on the position and orientation of the first stereo capturing section. A second stereo image is acquired based on a stereo video captured by a second stereo capturing section provided in the space where the first user exists and a virtual object image created based on the position and orientation of the second stereo capturing section. An image is selected from the first stereo image and the second stereo image according to an instruction of the further user. The selected image is presented to the further user.

5 Claims, 15 Drawing Sheets

U.S. PATENT DOCUMENTS

| | | | |
|---|---|---|---|
| 2004/0189675 A1* | 9/2004 | Pretlove et al. | 345/633 |
| 2005/0024388 A1* | 2/2005 | Takemoto | 345/633 |
| 2005/0234333 A1* | 10/2005 | Takemoto et al. | 600/426 |
| 2006/0170652 A1* | 8/2006 | Bannai et al. | 345/156 |

FOREIGN PATENT DOCUMENTS

| | | |
|---|---|---|
| EP | 1117074 A | 7/2001 |
| EP | 1117074 A2 | 7/2001 |
| EP | 1213686 A | 6/2002 |
| JP | 2001-095601 A | 7/2001 |
| JP | 2002-132487 A | 5/2002 |

* cited by examiner

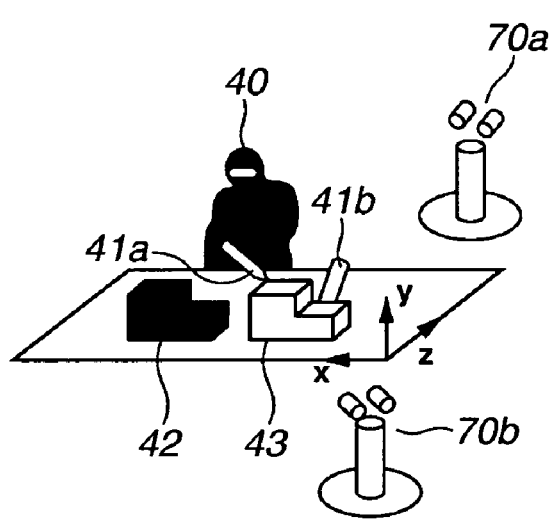
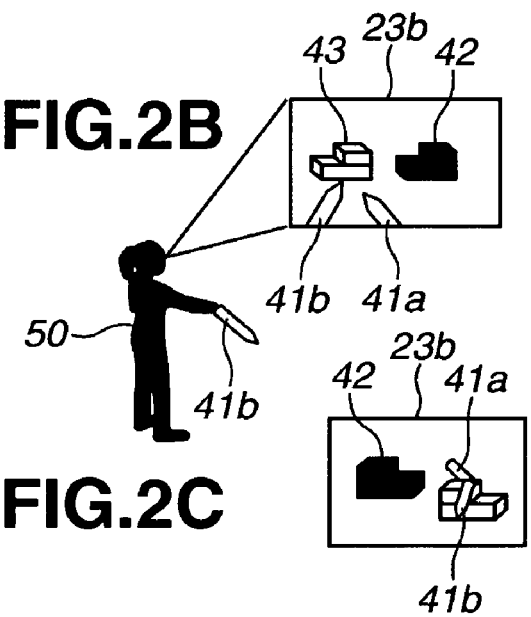
FIG.2A
FIG.2B
FIG.2C

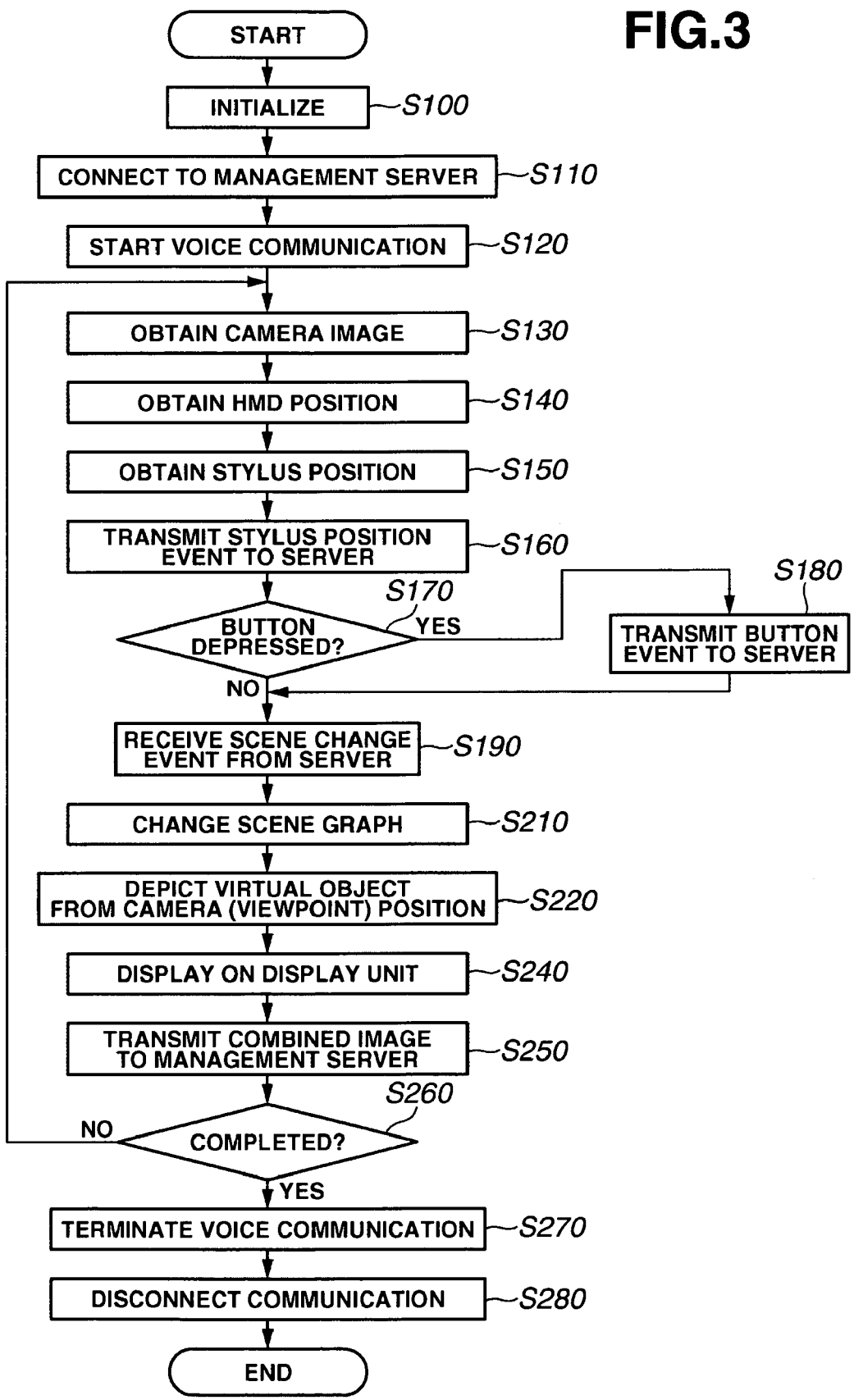

FIG.9

| WORKER MANIPULATION ARTICLE ID | null |
|---|---|
| INSTRUCTOR MANIPULATION ARTICLE ID | VIRTUAL OBJECT III |

FIG.10

|  | CAMERA VIEWPOINT COORDINATES | Flag |
|---|---|---|
| CAMERA I | (x1, y1, z1, $\alpha$1, $\beta$1, $\gamma$1) | On |
| CAMERA II | (x2, y2, z2, $\alpha$2, $\beta$2, $\gamma$2) |  |
| ....... | | |
| CAMERA n | (xn, yn, zn, $\alpha$n, $\beta$n, $\gamma$n) |  |
| WORKER'S CAMERA | - |  |

FIG.11

|  | Flag | Color |
|---|---|---|
| CAMERA I | On | Green |
| CAMERA II |  | Blue |
| ....... | | ....... |
| CAMERA nc |  | Yellow |
| WORKER'S CAMERA |  | Red |

FIG.12

|  | WORKER | REMOTE PARTICIPANT A | REMOTE PARTICIPANT B |  | REMOTE PARTICIPANT m |
|---|---|---|---|---|---|
| VIRTUAL OBJECT I |  | On |  | · |  |
| VIRTUAL OBJECT II |  |  |  | · |  |
| VIRTUAL OBJECT III |  |  | On | · |  |
|  | . . . . . . . . . | | | | |
| VIRTUAL OBJECT k |  |  |  |  |  |

FIG.13

| | CAMERA VIEWPOINT COORDINATES | REMOTE PARTICIPANT A | REMOTE PARTICIPANT B | REMOTE PARTICIPANT C | ... | REMOTE PARTICIPANT m |
|---|---|---|---|---|---|---|
| CAMERA I | $(x_1, y_1, z_1, \alpha_1, \beta_1, \gamma_1)$ | | On | | ... | |
| CAMERA II | $(x_2, y_2, z_2, \alpha_2, \beta_2, \gamma_2)$ | | | | ... | |
| ... | ... | | | | ... | |
| CAMERA n | $(x_n, y_n, z_n, \alpha_n, \beta_n, \gamma_n)$ | | | On | ... | |
| WORKER'S CAMERA | — | | | | ... | |

INFORMATION PROCESSING METHOD AND APPARATUS

BACKGROUND OF THE INVENTION

1. Field of the Invention

The present invention relates to a method and an apparatus that enables a second user to share a mixed reality space image including a virtual object superimposed in a space where a first user exists.

2. Description of the Related Art

A seamless mixing of a real world and a virtual world can be realized based on a recently developed mixed reality (MR) technique. The MR technique enhances a VR (virtual reality) technique so that the coexistence of a physical space and a virtual reality world can be realized, whereas, in the past, the VR world can be experienced only in a situation separated from the physical space.

A head mounted display apparatus (HMD) is a representative device required to realize the mixed reality. More specifically, the HMD can display a combined image of a physical space and a virtual space.

In a VR-based system for supporting a conference or another cooperative work performed among remote participants, a computer creates an above-described virtual world independent of the real world to let the remote participants share the created virtual world. On the other hand, an MR-based remote supporting system enables remote users to support the work of another user in a work space including a virtual world superimposed in the real world.

According to conventional techniques, remote participants can share a VR space and can observe the space by changing their viewpoints. For example, in a game machine, virtual spaces displayed for individual players can be combined so that other players can flexibly display the composite space from a desired angle and a desired position. The space created by a game machine is a virtual space that is independent of the real space. The game machine cannot realize a mixed reality including a virtual object superimposed with the object(s) in the real world. It is thus impossible to observe both the real object(s) and the virtual object(s) simultaneously by changing the viewpoint.

As discussed in Japanese Patent Application Laid-open No. 2002-132487 (corresponding to U.S. 2002/0049510 A1), a head mounted display apparatus (HMD) can be used to support remote working. According to the example, a camera-equipped HMD is mounted on a worker and both the worker and a remote instructor can share the image of the camera. The instructor can give a work instruction by superimposing the instruction on the camera image.

When the worker's camera is a stereo type, both the worker and the instructor can observe the same stereoscopic image. Furthermore, based on a chromakey combination method, an instructor's hand pointing to a work object in the image can be combined with the camera image.

Furthermore, according to the above-described conventional technique, a stationary camera is placed in addition to the worker's HMD and the image of the stationary camera can be transmitted to a remote instructor to let the instructor support the work. However, this system does not use the coordinate system defining the worker's space. Thus, it is impossible to set a virtual object other than the work object at an arbitrary position of the worker space to perform pointing or other interactions. Furthermore, this system does not use plural cameras placed in the worker's space and accordingly cannot allow a remote instructor to observe from plural viewpoints.

As discussed in Japanese Patent Application Laid-open No. 2001-195601 (corresponding to EP 1117074), plural objective viewpoint cameras can be fixed in a mixed reality space. A composite image including a virtual object superimposed on an image of this camera can be selectively displayed on plural display devices. However, this system cannot allow a remote instructor to perform an interaction, such as pointing or manipulating a virtual object, in the mixed reality space while observing the displayed image.

SUMMARY OF THE INVENTION

At least one exemplary embodiment is directed to a technique applicable to a worker's mixed reality space where a virtual object can be superimposed on the real video, and enabling a remote instructor to selectively display plural camera images including a worker's HMD camera image and seamlessly perceive the worker's space while observing the image and give a three-dimensional work instruction to a worker.

At least one exemplary embodiment is directed to a method and an apparatus that enable a second user to share a mixed reality space image including a virtual object superimposed in a space where a first user exists. At least one exemplary embodiment is directed to a technique that enables the second user to acquire a mixed reality space image from an arbitrary viewpoint.

According to an aspect of the present invention, there is provided an information processing method for enabling a further user to share a mixed reality space image including a virtual object superimposed in a space where a first user exists. The information processing method includes: a first image acquiring step of obtaining a first stereo image based on stereo video data from a first stereo capturing section mounted on the first user and a virtual object image created based on the position and orientation of the first stereo capturing section; a second image acquiring step of obtaining a second stereo image based on stereo video data from a second stereo capturing section provided in the space where the first user exists and a virtual object image created based on the position and orientation of the second stereo capturing section; a selecting step of selecting an image from the first stereo image and the second stereo image according to an instruction of the further user; and a displaying step of displaying the selected image to the further user.

According to another aspect of the present invention, there is provided an information processing apparatus that enables a further user to share a mixed reality space image including a virtual object superimposed in a space where a first user exists. The information processing apparatus includes: a first image acquiring unit configured to obtain a first stereo image based on stereo video data from a first stereo capturing section mounted on the first user and a virtual object image created based on the position and orientation of the first stereo capturing section; a second image acquiring unit configured to obtain a second stereo image based on stereo video data from a second stereo capturing section provided in the space where the first user exists and a virtual object image created based on the position and orientation of the second stereo capturing section; a selecting unit configured to select an image from the first stereo image and the second stereo image according to an instruction of the further user; and a display unit configured to display the selected image to the further user.

Furthermore, at least one exemplary embodiment is directed to a remote mixed reality sharing apparatus that enables at least one remote participant to share a worker's mixed reality space including a virtual object superimposed in a space where the worker exists. The apparatus includes a unit configured to transmit a video captured by a stereo camera mounted on the worker and a video captured by a stereo camera placed in the space where the worker exists to plural remote participants, a worker's stereoscopic display unit and a remote participant's stereoscopic display unit for stereoscopically displaying the video, and a viewpoint switching unit configured to permitting the plural remote participants to selectively switch the stereo camera video so that the worker's mixed reality space can be observed from different viewpoints and can be shared among the worker and remote participants.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A, 2B, and 2C are exemplary views showing the state of a worker's mixed reality space and screen displays in a remote instructor mixed reality apparatus.

FIG. 3 is a flowchart showing worker processing performed in a worker mixed reality apparatus in accordance with the first exemplary embodiment.

FIG. 9 is an exemplary view showing a virtual object manipulation table.

FIG. 10 is an exemplary view showing a camera management table.

FIG. 11 is an exemplary view showing a camera management table in accordance with a second exemplary embodiment.

FIG. 12 is an exemplary view showing a virtual object management table in accordance with the third exemplary embodiment.

FIG. 13 is an exemplary view showing a camera management table in accordance with the third exemplary embodiment.

DETAILED DESCRIPTION OF THE EMBODIMENTS

Figure 1:
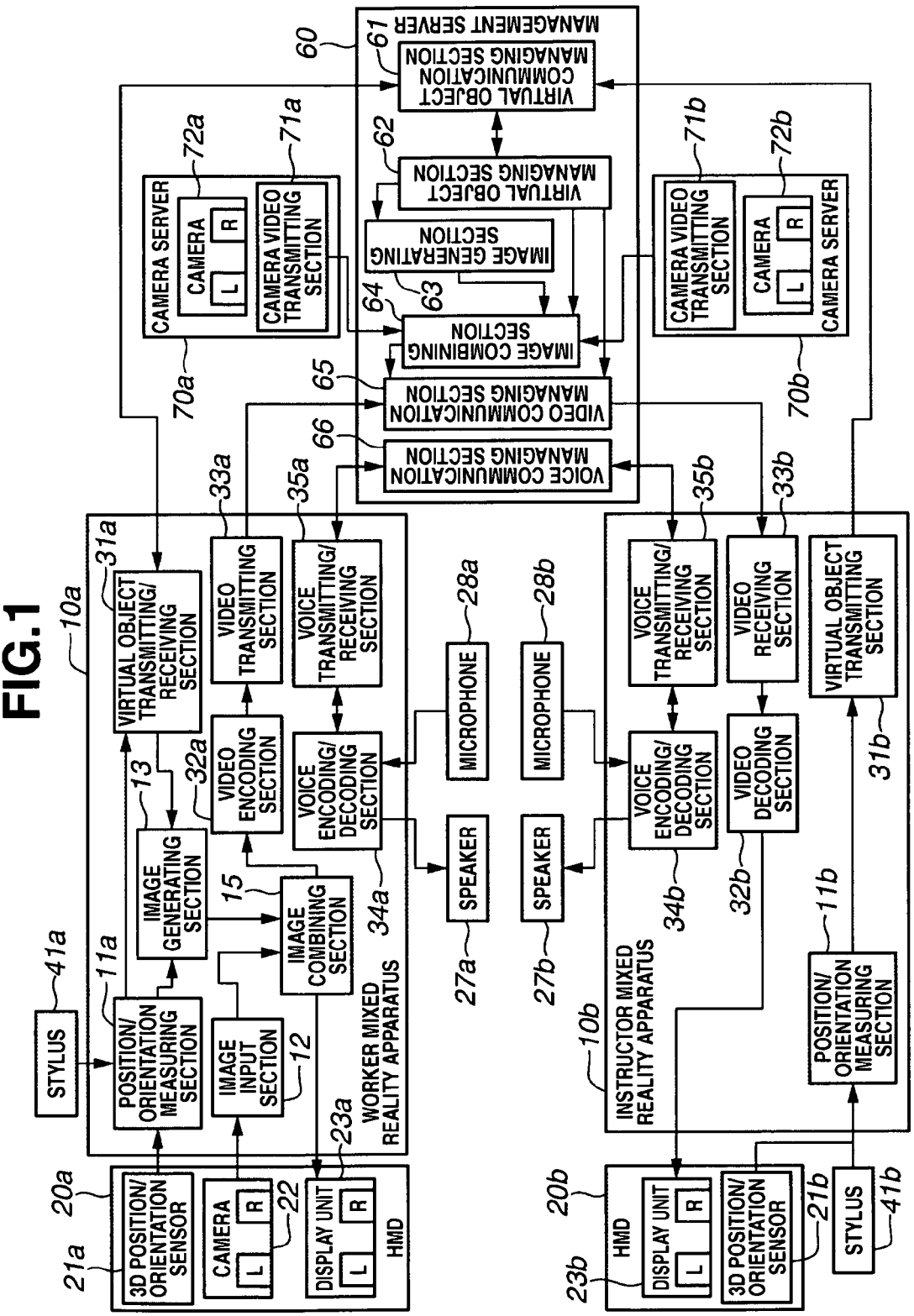
FIG. 1 is a block diagram showing the arrangement of a remote mixed reality sharing system in accordance with a first exemplary embodiment.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail, but are intended to be part of the enabling description where appropriate. For example, certain circuitry for signal processing, displaying, and other uses may not be discussed in detail. However these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it may not be discussed for following figures.

Exemplary embodiments will be described in detail below with reference to the drawings.

First Exemplary Embodiment

FIG. 1 shows a functional arrangement showing a remote mixed reality sharing system in accordance with a first exemplary embodiment. The remote mixed reality sharing system includes a worker mixed reality apparatus 10a shown at an upper part of FIG. 1 and an instructor mixed reality apparatus 10b shown at a lower part of FIG. 1. The worker mixed reality apparatus 10a and the instructor mixed reality apparatus 10b can communicate with each other via a network including a management server 60. The worker mixed reality apparatus 10a is associated with a head mounted display (HMD) 20a.

The instructor mixed reality apparatus 10b is associated with a head mounted display (HMD) 20b. With the arrangement shown in FIG. 1, both a worker and an instructor can look, through the HMD, at a mixed reality video of the space where the worker is present. Furthermore, to perform conversation with each other, the worker mixed reality apparatus 10a is equipped with a speaker 27a and a microphone 28a. The instructor mixed reality apparatus 10b is equipped with a speaker 27b and a microphone 28b.

The worker's HMD 20a includes a three-dimensional position and orientation sensor 21a that can magnetically measure the position and the orientation of the HMD, a stereo camera 22 (including a left (L) eye camera and a right (R) eye camera) that can capture a physical space to obtain an image, and a stereo display unit 23a (including a left (L) eye display and a right (R) eye display).

The positional relationship between the three-dimensional position and orientation sensor 21a and the camera 22 is measured beforehand and is fixed.

The three-dimensional position and orientation sensor 21a outputs a position and orientation signal, as a measurement result, to a later-described position and orientation measuring section 11a.

The camera 22 outputs a capture result to a later-described image input section 12. The display unit 23a receives a left eye image signal and a right eye image from an image combining section 15, and displays the received images on a left eye display 23a (L) and a right eye display 23a (R), respectively.

The position and orientation measuring section 11a, provided in the worker mixed reality apparatus 10a, can receive the three-dimensional position and orientation signal transmitted from the three-dimensional position and orientation sensor 21a of the HMD 20a and a three-dimensional position and orientation signal entered from a stylus 41a.

The stylus 41a is a three-dimensional pointing device in a mixed reality space.

The position and orientation measuring section 11a outputs position and orientation data of the stylus to a virtual object transmitting/receiving section 31a, and outputs position and orientation data of the HMD 20a to an image generating section 13. The virtual object transmitting/receiving section 31a can transmit the stylus position and orientation data, received from the position and orientation measuring section 11a, to the management server 60.

The virtual object transmitting/receiving section 31a can receive, from the management server 60, position and orientation information of the worker's stylus and the instructor's stylus as well as change information of a virtual object. The virtual object transmitting/receiving section 31a outputs the information received from the management server 60 to the image generating section 13.

The image generating section 13 can store, beforehand, a scene graph of the virtual object. The image generating section 13 receives the position and orientation of each stylus and the virtual object manipulation result information from the virtual object transmitting/receiving section 31a, and receives worker viewpoint information (i.e., HMD position and orientation information) from the position and orientation measuring section 11a.

The image generating section 13 can create, based on the obtained information, a left eye virtual space computer graphics (CG) image and a right eye virtual space CG image. The image combining section 15 can input, via an image input section 12, the image from the left eye camera 22 (L) and the right eye camera 22 (R).

The image combining section 15 can combine the left eye virtual space CG image and the right eye virtual space CG image, produced from the image generating section 13, on the received captured image. AS a result, the left eye display 23a (L) and the right eye display 23a (R) of the display unit 23a can superimpose the data of a virtual space obtained from a worker viewpoint on the image captured by the camera. A video encoding section 32a can compress and encode the superimposed image and can transmit the compressed and encoded image data via a video transmitting section 33a to the management server 60.

The instructor mixed reality apparatus 10b is simple in the arrangement compared with the worker mixed reality apparatus 10a. The HMD 20b has no camera. Thus, the instructor mixed reality apparatus 10b cannot input a camera image.

To create the mixed reality video of the worker space, a video receiving section 33b can receive the camera image signals of the worker HMD 20a or stereo image signals of camera servers 70a and 70b via the management server 60.

A video decoding section 32b decodes the received signals. A display unit 23b includes a left eye display 23b (L) and a right eye display 23b (R) to display the images sent from the video decoding section 32b. A position and orientation measuring section 11b can input the position and orientation of the instructor's HMD 20b from a three-dimensional position and orientation sensor 21b and the three-dimensional position and orientation of a stylus 41b.

A virtual object transmitting section 31b can transmit the position and orientation information, obtained by the position and orientation measuring section 11b, to the management server 60. The position and orientation information can be used as instructor's shared virtual object pointing/manipulation information.

When the connection between the worker mixed reality apparatus 10a and the instructor mixed reality apparatus 10b is established via the management server 60, a voice communication module can be activated to transmit and receive bidirectional voice data via a voice communication managing section 66. As a result, the worker using the speaker 27a and the microphone 28a can talk with the instructor using the speaker 27b and the microphone 28b. The voice data is processed by voice encoding/decoding sections 34a and 34b and voice transmitting/receiving sections 35a and 35b.

The camera servers 70a and 70b can transmit the images captured by stereo cameras 72a and 72b being set in the worker space via the network to the management server 60. The camera servers 70a and 70b include camera video transmitting sections 71a and 71b to transmit a right eye image and a left eye image of respective stereo cameras 72a and 72b to an image combining section 64 of the management server 60. When the network has a narrow bandwidth, the camera video transmitting section can include an image encoding apparatus (not shown), and the image combining section 64 of the management server can include an image decoding apparatus (not shown), to reduce the network traffic.

The management server 60 can manage the information used or handled in the remote mixed reality sharing system. A virtual object communication managing section 61 manages the communications between the worker mixed reality apparatus 10a and the instructor mixed reality apparatus 10b with respect to the information relating to the stylus and the virtual object. A virtual object managing section 62 manages the information relating to a scene graph of the shared virtual object including the stylus and the manipulation right of the shared virtual object.

The virtual object managing section 62 transmits the information relating to the scene graph of the shared virtual object to an image generating section 63. The image generating section 63 has the capability of rendering the data of the virtual object seen from the viewpoint of a camera selected by the instructor. The image generating section 63 sends the rendered data of the virtual object to the image combining section 64.

The position and orientation of the respective cameras 72a and 72b are measured beforehand in the world coordinate system of the worker space. The image combining section 64 superimposes the above-described rendered CG data on the image captured by the camera selected by the instructor. The image combining section 64 transfers the superimposed image to a video communication managing section 65.

The mixed reality image of the camera selected by the instructor is thus sent via the video communication managing section 65 to the instructor mixed reality apparatus 10b.

When the instructor selects the worker's camera, the image captured by the worker mixed reality apparatus 10a can be directly sent to the instructor mixed reality apparatus 10b.

FIGS. 2A, 2B, and 2C exemplarily illustrate the operation performed by the system shown in FIG. 1.

FIG. 2A shows the state of a worker 40 wearing the HMD 20a working in the mixed reality space, with a real work object 42 and a CG 3D virtual object 43 representing the work object stereoscopically displayed.

The worker 40 can share the virtual object 43 with the instructor. The instructor can use the virtual object 43 to instruct the contents or examples of the work. As shown in the drawing, the world coordinate system (x, y, z) is set beforehand to define the physical space of the worker 40. The virtual object 43 (i.e., as an exemplary model) placed in the world coordinate system can be seen in a positional relationship as if it is placed next to the real work object 42 when observed through the HMD.

Using a stylus having a magnetic sensor enables various interactions, such as selecting a virtual object or shifting the selected object. A pointer 41a represents the stylus of the worker 40 superimposed on the CG virtual object. A pointer 41b represents the stylus of the instructor superimposed on the CG virtual object. The camera servers 70a and 70b, having the stereo cameras mounted thereon, are connected via a network (not shown) to the management server 60. The images captured by the cameras can be provided, as remote instructor viewpoint images, to the instructor.

FIG. 2B shows a space where a remote instructor 50 is present. The instructor 50, having the HMD 20b, can look at a stereoscopic image displayed on the display unit 23b of the HMD 20b. The stereoscopic image includes the work object 42 seen from the viewpoint of the camera 70a, its 3D CG model 43, the pointer 41a showing the stylus position of the worker 40, and the pointer 41b showing the stylus position of the instructor 50.

The HMD 20b and the stylus 41b of the instructor 50, having magnetic sensors mounted thereon, can measure the relative positional relationship between the viewpoint position and the stylus. The measured positional relationship can be converted into a positional relationship seen from the camera viewpoint, to define the stylus position of the instructor 50 seen from the camera viewpoint. The instructor 50 can give a work instruction to the worker 40 by pointing to the virtual object 43 with the pointer 41b while looking at the image on the display unit 23b or by shifting the article of the virtual object 43.

The shifting of the virtual object 43 can be performed by shifting the stylus 41a or 41b to the position of the virtual object 43 and depressing a first button provided on the stylus. With this operation, a holding mode of the stylus starts to shift the virtual object together with the stylus. If the first button of the stylus is depressed again in the holding mode, the holding mode ends and the virtual object can be released from the stylus. To prevent any interference between the manipulation by the worker 40 and the manipulation by the instructor 50, either the worker's stylus or the instructor's stylus can enter the holding mode to shift the virtual object.

The image on the display unit 23b shown in FIG. 2C is a mixed reality image seen from the viewpoint of the camera 70b. The instructor 50 can switch the camera viewpoint by depressing a second button provided on the stylus. Similar to the above-described FIG. 2B, the instructor 50 can perform an operation on this screen. The pointer 41b of the instructor 50 is displayed at a position defined based on a new camera position with respect to the relative relationship between a head position of the instructor 50 and the stylus position.

From this condition, the instructor 50 can depress the second button of the stylus to switch the image on the display unit 23b to the image seen from the viewpoint of the worker 40.

In this case, the image that the worker 40 can look through the HMD 20a perfectly agrees with the image that the instructor 50 can look through the HMD 20b. In this condition, the instructor 50 can further depress the second button of the stylus to display the image shown in FIG. 2B on the display unit 23b of the instructor's HMD 20b. In this manner, by using the second button of the stylus, the instructor 50 can successively switch the images of the cameras existing in the space where the worker 40 is present. Thus, the instructor 50 can instruct and assist the work of the worker 40 from an optimum viewpoint selected depending on the situation.

The above-described operation will be described in more detail with reference to following drawings.

FIG. 3 is a flowchart showing the operation of the worker mixed reality apparatus 10a, to do the work in the mixed reality working space. Although not shown in FIG. 2A, the worker mixed reality apparatus 10a is located at an appropriate position and is connected to the worker's HMD 20a and to the stylus 41a. The worker mixed reality apparatus 10a can communicate with the instructor mixed reality apparatus 10b via the management server 60 provided on a network.

In step S100, the worker mixed reality apparatus 10a can be initialized. The initialization in this step includes the setting of a world coordinate system of the mixed reality working space (i.e., the coordinate system defined in the real world shown in FIG. 2A). A later-described sensor can produce an output consisting of a data set of 6 parameters (x, y, z, $\alpha$, $\beta$, $\gamma$) defined in this coordinate system, wherein $\alpha$ represents a rotational angle about the x axis, $\beta$ represents a rotational angle about the y axis, and y represents a rotational angle about the z axis. Furthermore, initial data of the virtual object 43 (serving as a reference of the real object 42) can be disposed in the world coordinate system and stored as scene graph data in the image generating section 13.

In the next step S110, the worker mixed reality apparatus 10a can establish a connection via the network with the management server 60 for the transmission and reception of the data. The worker mixed reality apparatus 10a can upload the information relating to the virtual object and the world coordinates set in step S100 via the virtual object transmitting/receiving section 31a to the management server 60.

In step S120, the worker mixed reality apparatus 10a and the management server 60 can set a connection for the voice communications. In this condition, the instructor mixed reality apparatus 10b can also set a connection for the voice communications with the management server 60. With the above settings, the worker and the instructor can talk with each other with the speakers 27a and 27b (i.e., voice output devices) and the microphones 28a and 28b (i.e., voice input devices).

In step S130, the image captured by the camera 22 mounted on the worker's HMD 20a can be entered via the image input section 12 to the image combining section 15. The camera 22 includes the left (L) eye camera and the right (R) eye camera corresponding to both eyes of the worker. The images sent from respective cameras can be stored in different buffers of the image combining section 15.

In the next step S140, the position and orientation of the worker's head can be sent from the HMD three-dimensional position sensor 21a to the position and orientation measuring section 11a. The position and orientation measuring section 11a can produce the set data of 6 parameters in the world coordinate system.

In the next step S150, three-dimensional position and orientation information of the worker's stylus 41a can be sent to the position and orientation measuring section 11a. The data obtained from the stylus 41a has the pattern similar to the data obtained from the above-described HMD three-dimensional position sensor 21a.

In step S160, the position and orientation information of the worker's stylus obtained in step S150 can be transmitted, as an event, to the management server 60 via the virtual object transmitting/receiving section 31a.

In step S170, it is determined whether the first or second button of the worker's stylus is depressed. When the first or second button is depressed (i.e., YES in step S170), the control processing proceeds to step S180. Otherwise, the control processing proceeds to step S190.

In step S180, the depressed button event can be transmitted via the virtual object transmitting/receiving section 31a to the management server 60.

In step S190, the virtual object transmitting/receiving section 31a can receive, as an event, the information relating to changes of the worker's pointer, the instructor's pointer, and the virtual object from the management server 60.

In step S210, the scene graph stored in the image generating section 13 can be changed based on the change information obtained in step S190.

In step S220, the scene graph of the virtual object reflecting the manipulation result, the worker's pointer 41a, and the instructor's pointer 41b can be created as a left eye image and a right eye image obtained from the view (position and orientation) of the camera. The created images can be overwritten on the left eye camera image and the right eye camera image in the image combining section 15.

Thus, a combined image of the virtual object and the real object can be obtained. The three-dimensional position and orientation sensor 21a, the left eye camera 22 (L), and the right eye camera 22 (R) are in a fixed positional relationship. Thus, it is possible to obtain a transformation equation beforehand by performing calibration. The obtained transformation equation can be used to determine the position and orientation of the camera viewpoint.

In the next step S240, the left eye combined image and the right eye combined image in the image combining section 15 can be displayed on the left eye display unit 23a (L) and the right eye display unit 23a (R) of the worker HMD 20a, respectively.

In step S250, the both eye images identical with those displayed on the display unit 23a of the worker's HMD 20a can be encoded in the video encoding section 32a. The encoded images can be transmitted via the video transmitting section 33a to the video communication managing section 65 of the management server 60.

In the next step S260, it is determined whether a termination command of the worker mixed reality apparatus 10a is entered. When the termination command is entered (i.e., YES in step S260), the processing flow proceeds to step S270 to execute the voice communication completion processing. Otherwise, the processing flow returns to step S130.

In step S270, the worker mixed reality apparatus 10a can terminate the voice communication processing. Then, in step S280, the worker mixed reality apparatus 10a can disconnect the communications with the management server 60 before terminating the processing of this routine.

Figure 4:
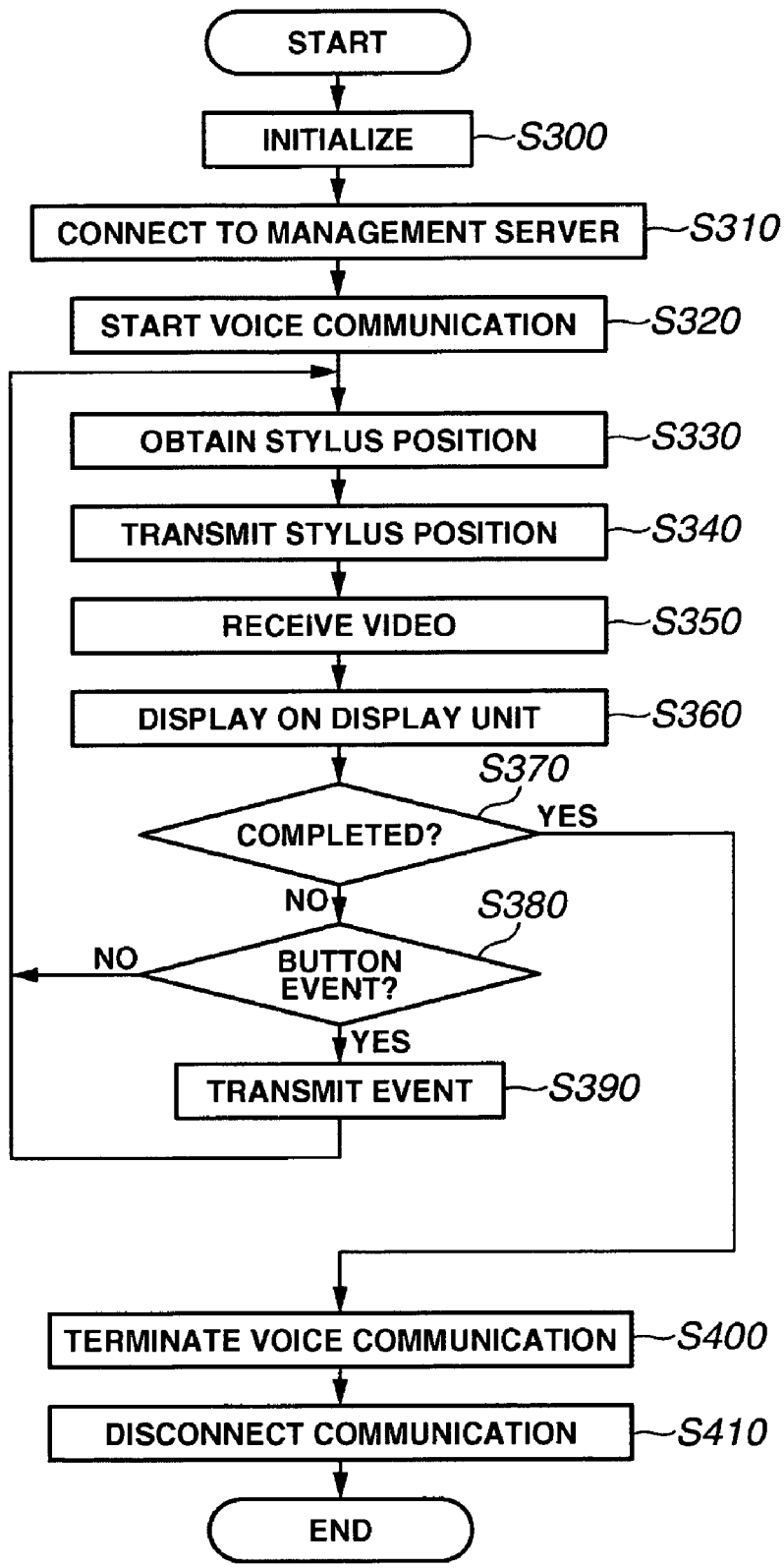
FIG. 4 is a flowchart showing instructor processing performed in an instructor mixed reality apparatus in accordance with the first exemplary embodiment.

FIG. 4 is a flowchart showing the operation of the instructor mixed reality apparatus 10b that instructs and supports the work in the mixed reality working space.

In step S300, the instructor mixed reality apparatus 10b can be initialized. The initialization in this step includes the setting of a world coordinate system of the space where the instructor is present, which is performed by the position and orientation measuring section 11b. Similar to the sensor of the worker mixed reality apparatus 10a, a later-described sensor of the instructor mixed reality apparatus 10b can produce an output consisting of a data set of 6 parameters defined in this coordinate system, In the next step S310, the instructor mixed reality apparatus 10b can establish a connection via the network with the management server 60 for the transmission and reception of the data.

In step S320, the instructor mixed reality apparatus 10b and the worker mixed reality apparatus 10a can start voice communications via the voice communication managing section 66 of the management server 60. With the above settings, the instructor and the worker can talk with each other with the speakers 27a and 27b (i.e., voice output devices) and the microphones 28a and 28b (i.e., voice input devices).

In step S330, the position and orientation $(x_h, y_h, z_h, \alpha_h, \beta_h, \gamma_h)$ of the instructor's viewpoint can be entered from the HMD three-dimensional position sensor 21b to the position and orientation measuring section 11b. Furthermore, the three-dimensional position and orientation information $(x_s, y_s, z_s, \alpha_s, \beta_s, \gamma_s)$ of the instructor's stylus 41b can be entered into the position and orientation measuring section 11b. These position and orientation data is defined in the world coordinate system of the space where the instructor exists. The position and orientation of the stylus 41b can be converted into the relative position and orientation seen from the instructor's viewpoint. As a result, the instructor's stylus relative position $(x_d, y_d, z_d, \alpha_d, \beta_d, \gamma_d) = (x_s - x_h, y_s - y_h, z_s - z_h, \alpha_s - \alpha_h, \beta_s - \beta_h, \gamma_s - \gamma_h)$ can be calculated.

In step S340, the instructor's stylus relative position calculated in step S330 can be transmitted via the virtual object transmitting section 31b to the virtual object communication managing section 61 of the management server 60.

In step S350, the video receiving section 33b can receive both the left eye image and the right eye image from the video communication managing section 65 of the management server 60. Both the left eye image and the right eye image can be decoded in the video decoding section 32b.

In step S360, the decoded left eye and right eye images can be displayed on the left eye display unit 23b (L) and the right eye display unit 23b (R) of the instructor's HMD 20b.

In the next step S370, it is determined whether a termination command of the instructor mixed reality apparatus 10b is entered. When the termination command is entered (i.e., YES in step S370), the processing flow proceeds to step S400 to execute the voice communication terminate processing. Otherwise, the processing flow proceeds to step S380.

In step S380, it is determined whether there is a button event that can be generated when the instructor clicks the stylus button. When the button event is generated (i.e., YES in step S380), the processing flow proceeds to step S390. Otherwise, the processing flow returns to step S330 to repeat the above-described processing.

In step S390, the instructor mixed reality apparatus 10b can transmit the event to the virtual object communication managing section 61 of the management server 60. Then, the processing flow returns to step S330.

In step S400, the instructor mixed reality apparatus 10b can terminate the voice communication processing.

Then, in step S410, the instructor mixed reality apparatus 10b can disconnect the communications with the management server 60 before terminating the processing of this routine.

Figure 5A:
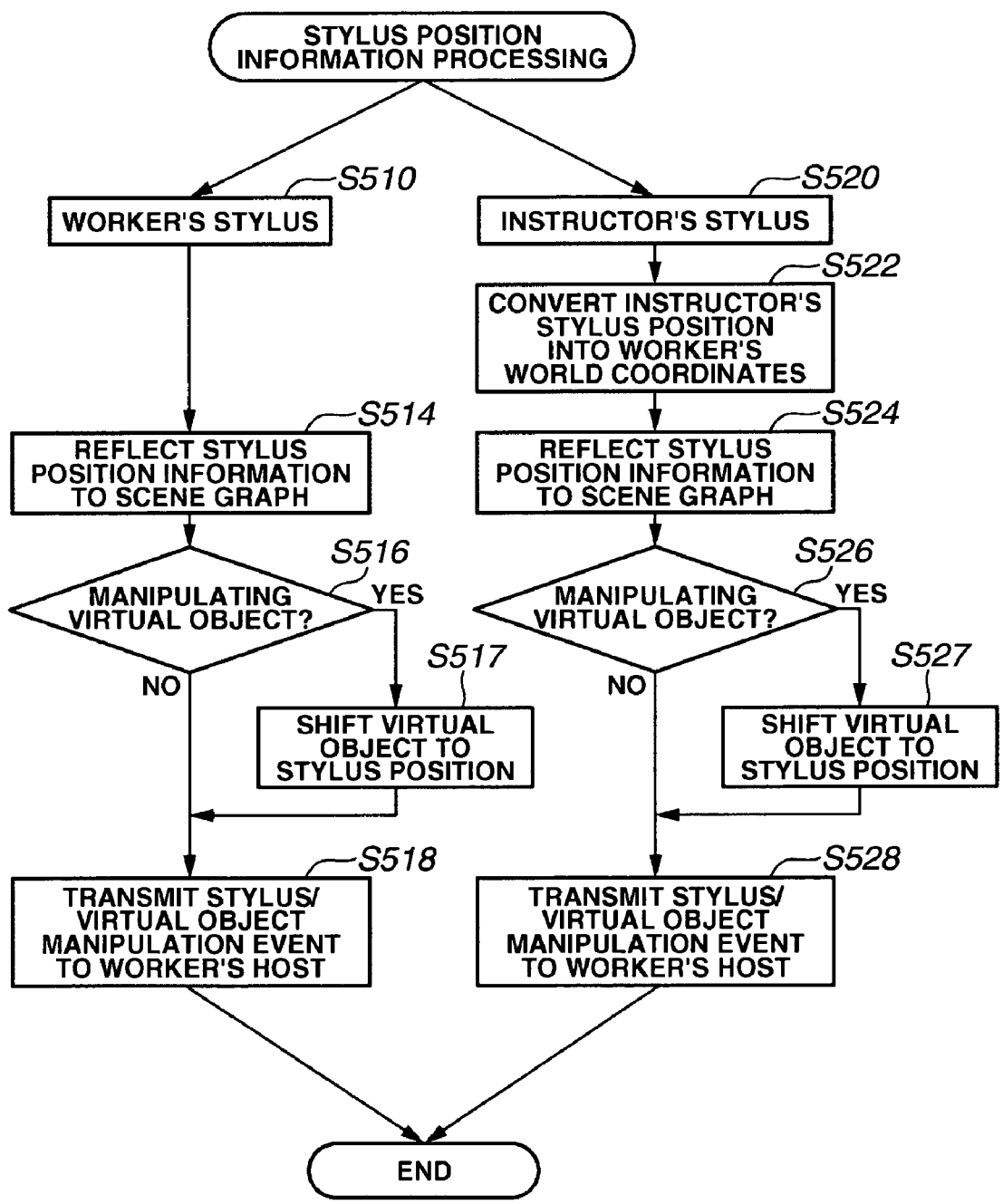
FIGS. 5A, 5B, and 5C are flowcharts showing reception event processing performed in a management server in accordance with the first exemplary embodiment.

Next, various event processing performed in the management server 60 will be described with reference to FIGS. 5A, 5B, and 5C. FIG. 5A is a flowchart showing stylus position information processing.

The virtual object communication managing section 61 can receive stylus position information from both of the worker and the instructor. The management server 60 starts the processing of step S510 in response to entry of worker's stylus position information. In step S514, the management server 60 reflects the worker's stylus information expressed by 6 parameters to the pointer information of the scene graph stored in the virtual object managing section 62.

In step S516, it is determined whether the worker is presently manipulating a virtual object with the stylus, with reference to a virtual object manipulation table shown in FIG. 9. The virtual object manipulation table, consisting of two columns of a worker manipulation article ID and an instructor manipulation article ID, shows virtual objects currently manipulated by the worker and the instructor. More specifically, from the table of FIG. 9, it is known that the worker is manipulating a virtual object having an ID stored in the column of the worker manipulation article ID, while the instructor is manipulating a virtual object having an ID stored in the column of the instructor manipulation article ID. When there is no virtual object currently manipulated, "null" is stored in the table.

When the ID of any virtual object corresponding to the worker manipulation article ID is stored in the table (i.e., YES in step S516), the worker is presently manipulating the virtual object having the identified ID. The processing flow proceeds to step S517. On the other hand, when the "null" is stored in the table (i.e., NO in step S516), the worker is presently manipulating no virtual object. The processing flow proceeds to step S518.

In step S517, the management server 60 shifts the virtual object to the stylus position and changes the scene graph stored in the virtual object managing section 62. In step S518, the management server 60 transmits both the stylus position and a virtual object manipulation event to the worker mixed reality apparatus 10a before terminating the processing of this routine.

When the instructor's stylus position information is received, the management server 60 starts the processing of step S520. In step S522, the management server 60 converts the relative position information of the instructor's stylus seen from the instructor's viewpoint into relative position information seen from the viewpoint of a selected camera. More specifically, the instructor's stylus relative position ($x_d$, $y_d$, $z_d$, $\alpha_d$, $\beta_d$, $\gamma_d$) obtained in step S330 can be converted into the worker space world coordinates, as a relative position seen from the viewpoint of the selected camera. Namely, when the coordinates ($x_w$, $y_w$, $z_w$, $\alpha_w$, $\beta_w$, $\gamma_w$) represent the camera viewpoint, the instructor's stylus has the coordinates ($x_w+x_d$, $y_w+y_d$, $z_w+z_d$, $\alpha_w+\alpha_d$, $\beta_w+\beta_d$, $\gamma_w+\gamma_d$). The viewpoint position of the selected camera can be obtained from the second column of a later-described table shown in FIG. 10.

In step S524, the management server 60 reflects the instructor's stylus information obtained in step S522 to the pointer information of the scene graph stored in the virtual object managing section 62. In step S526, it is determined whether the instructor is presently manipulating a virtual object with the stylus, with reference to the virtual object manipulation table shown in FIG. 9.

When the ID of any virtual object corresponding to the instructor manipulation article ID is stored in the table (i.e., YES in step S526), the instructor is presently manipulating the virtual object having the identified ID. The processing flow proceeds to step S527. On the other hand, when the "null" is stored in the table (i.e., NO in step S526), the instructor is presently manipulating no virtual object. The processing flow proceeds to step S528.

In step S527, the management server 60 shifts the virtual object to the instructor's stylus position and changes the scene graph stored in the virtual object managing section 62. In step S528, the management server 60 transmits both a stylus pointer changing event and a virtual object manipulation event to the worker mixed reality apparatus 10a before terminating the processing of this routine.

Figure 5B:
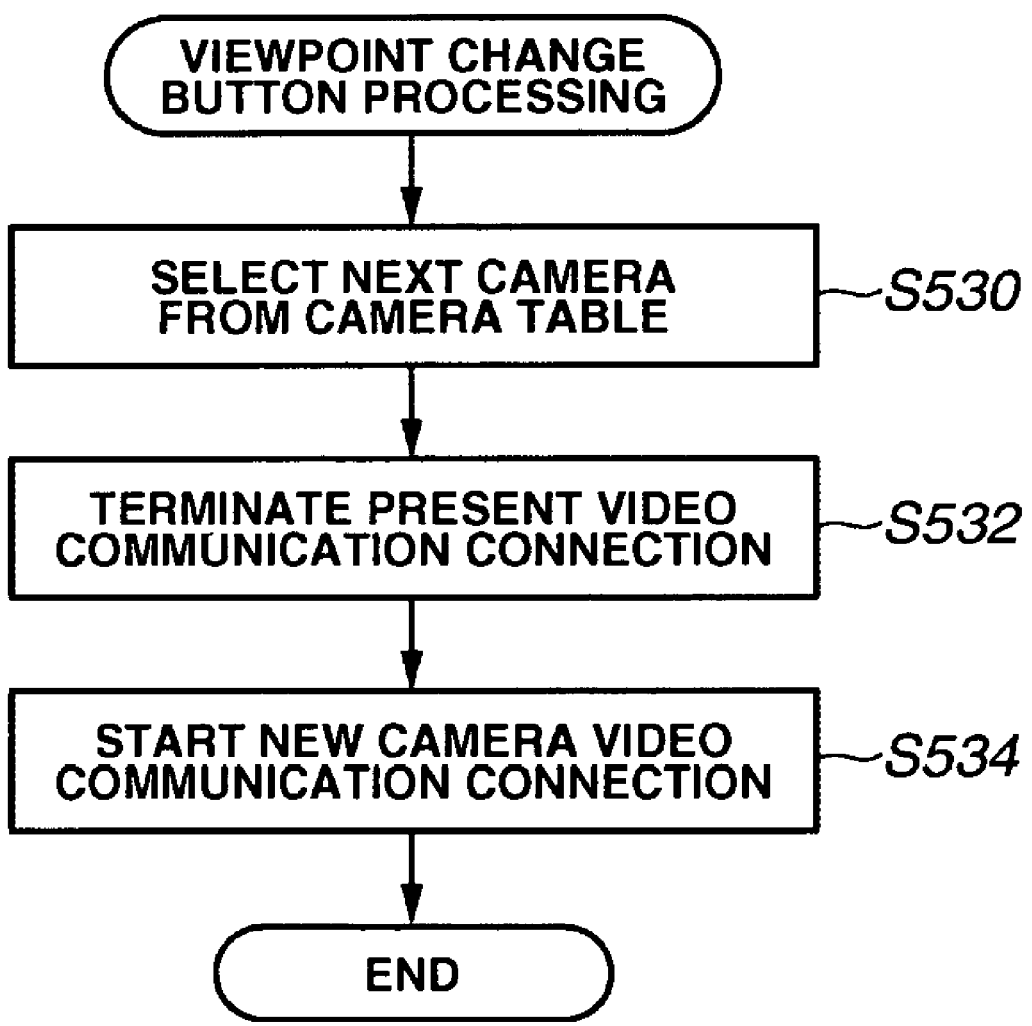

FIG. 5B shows the viewpoint changing button event processing. When the instructor depresses the second button of the stylus, this event can be received by the virtual object communication managing section 61 and sent to the virtual object managing section 62. The camera management table of FIG. 10 shows plural camera viewpoints that the instructor can select as a viewpoint for observing the mixed reality space. The table of FIG. 10 includes plural camera IDs listed in the first column. According to the example, there are a total of n cameras in addition to the worker's camera.

The second column of the table lists the positional data of camera viewpoints expressed by a data set of 6 parameters defined in the world coordinate system of the worker space.

The third column of the table shows the state of "Flag" that indicates the camera presently providing the viewpoint for the instructor. Only one camera (the camera I according to the example of FIG. 10) has On Flag and other cameras have Off Flag. This means that the instructor's viewpoint image can be provided by the camera I.

When the second button of the instructor's stylus is depressed in this condition, On Flag shifts to the camera II and the camera I has Off Flag. In this manner, every time the button is depressed, the instructor's viewpoint camera can be successively changed (selected) in the order shown in the table of FIG. 10. According to this order, the worker's camera can be finally selected and then the camera I can be selected again.

In step S530, as described above, On Flag shifts from the presently selected camera to the next camera.

In the next step S532, the virtual object managing section 62 sends a termination command to the video communication managing section 65 to terminate the present video connection. The video communication managing section 65 then disconnects the video communications. In step S534, the video communication managing section 65 starts a new connection of video communications with reference to the camera management table shown in FIG. 10. When the camera having the On Flag is a camera of the camera server, the image signal of the selected camera can be entered into the image combining section 64.

When the camera having the On Flag is the worker's camera, no image signal can be entered from the image combining section 64 to the video communication managing section 65. Instead, the output of the worker mixed reality apparatus 10a can be transmitted from the voice communication managing section 66 to the instructor mixed reality apparatus 10b before terminating the processing of this routine. In this manner, the instructor can switch the viewpoint of the mixed reality video.

Figure 5C:
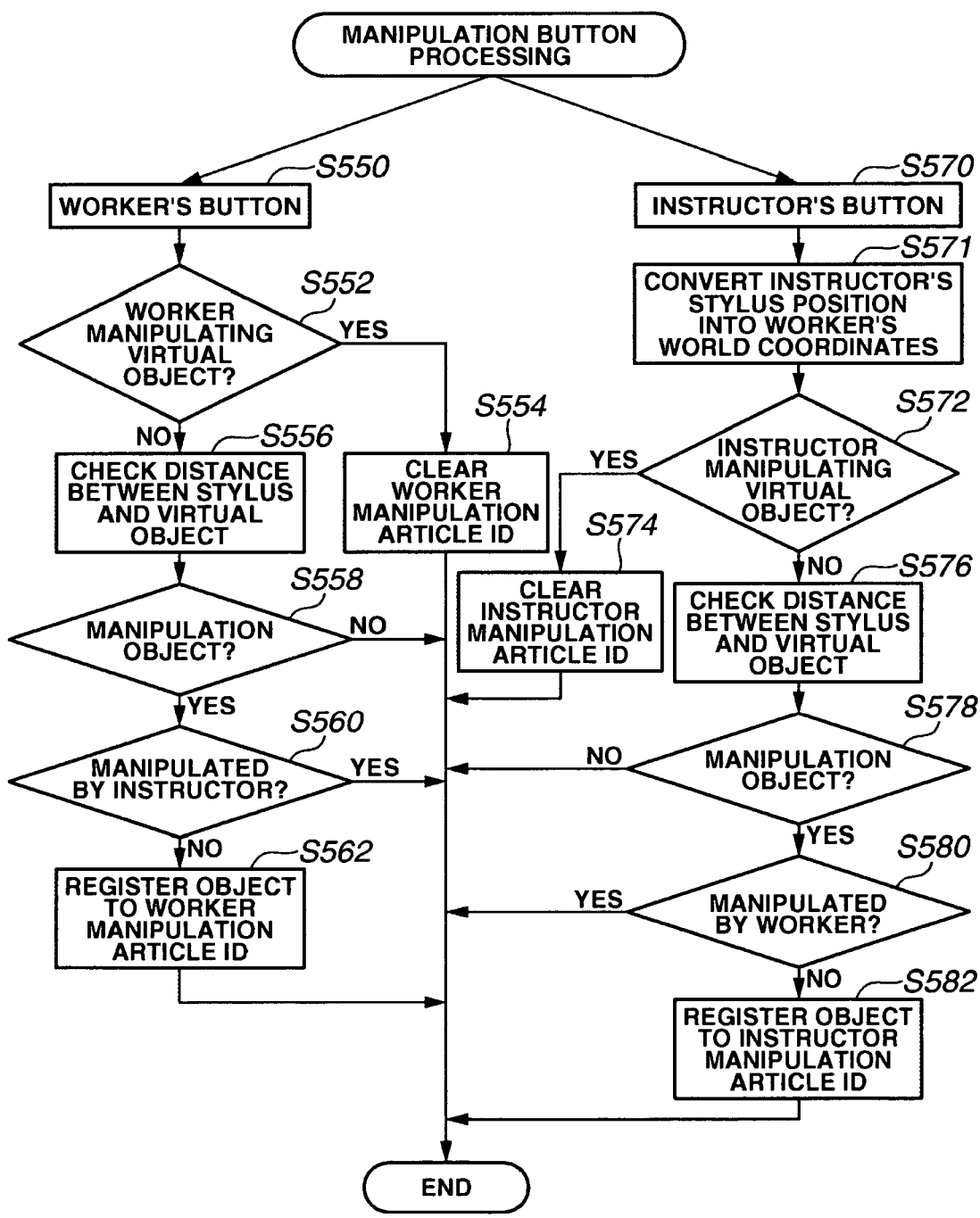

FIG. 5C shows the manipulation button processing. When the worker's stylus button is depressed, worker's button processing of step S550 starts. When the first button of the instructor's stylus is depressed, the instructor's button processing of step S570 starts.

In step S552 of the worker's button event processing, it is determined whether the worker is presently manipulating any virtual object, by checking the worker manipulation article ID shown in FIG. 9. When the worker manipulation article ID is null (i.e., NO in step S552), the worker is presently manipulating no virtual object and accordingly the processing flow proceeds to step S556. When any worker manipulation article ID is stored (i.e., YES in step S552), the worker is presently manipulating a virtual object and accordingly the processing flow proceeds to step S554.

In step S554, the management server 60 rewrites the contents of the worker manipulation article ID shown in FIG. 9 to null and terminates the worker's button event processing.

In step S556, the management server 60 compares the present worker's stylus position stored in the virtual object managing section 62 with the positions of all virtual objects existing in the worker's mixed reality space, and proceeds to step S558.

In step S558, it is determined based on the comparison result whether there is any virtual object within a predetermined distance (i.e., whether the distance is within a threshold). When there is any virtual object (i.e., YES in step S558), the virtual object (e.g., a closest one in the case of plural virtual objects) is identified as a manipulation object and the processing flow proceeds to step S560. Otherwise, the management server 60 terminates the worker's button event processing.

In step S560, it is determined whether the manipulation object ID obtained in step S558 agrees with the instructor manipulation article ID shown in FIG. 9. When the compared IDs agree with each other (i.e., YES in step S560), the instructor is presently manipulation the identified virtual object. The management server 60 terminates the worker's button event processing. When the compared IDS disagree with each other (i.e., NO in step S560), the processing flow proceeds to step S562.

In step S562, the management server 60 writes the manipulation object ID obtained in step S558, as the worker manipulation article ID, into the table of FIG. 9 before terminating the worker's button event processing.

On the other hand, in step S571 of the instructor's button event processing, the management server 60 converts the instructor's stylus position into the worker's world coordinates, by performing the processing similar to that of step S522 of FIG. 5A. The virtual object managing section 62 stores the converted instructor's stylus position.

In step S572, it is determined whether the instructor is presently manipulating any virtual object, by checking the instructor manipulation article ID shown in FIG. 9. When the instructor manipulation article ID is null (i.e., NO in step S572), the instructor is presently manipulating no virtual object and accordingly the processing flow proceeds to step S576. When any instructor manipulation article ID is stored (i.e., YES in step S572), the instructor is presently manipulating a virtual object and accordingly the processing flow proceeds to step S574.

In step S574, the management server 60 rewrites the contents of the instructor manipulation article ID shown in FIG. 9 to null and terminates the reception event processing.

In step S576, to obtain a distance, the management server 60 compares the present instructor's stylus position stored in the virtual object managing section 62 with the positions of all virtual objects existing in the worker's mixed reality space.

In step S578, it is determined based on the comparison result whether there is any virtual object within a predetermined distance (i.e., whether the distance is within a threshold). When there is any virtual object (i.e., YES in step S578), the virtual object (e.g., a closest one in the case of plural virtual objects) is identified as a manipulation object and the processing flow proceeds to step S580. Otherwise, the management server 60 terminates the reception event processing.

In step S580, it is determined whether the manipulation object ID obtained in step S578 agrees with the worker manipulation article ID shown in FIG. 9. When the compared IDs agree with each other (i.e., YES in step S580), the worker is presently manipulation the identified virtual object. The management server 60 terminates the reception event processing.

When the compared IDs disagree with each other (i.e., NO in step S580), the processing flow proceeds to step S582.

In step S582, the management server 60 writes the manipulation object ID obtained in step S578, as the instructor manipulation article ID, into the table of FIG. 9 before terminating the reception event processing.

The worker manipulation article ID and the instructor manipulation article ID shown in FIG. 9 can be referred to from plural processes (or threads). The management server 60 rewrites the contents of the table, while blocking the accesses from other processes (or threads). In this manner, the management server 60 can manage the manipulation right of each virtual object.

The exemplary embodiment uses two cameras set in the worker's space. However, the above-described processing can be easily performed even when the total number of cameras is three or more. Furthermore, the three-dimensional position and orientation sensors 21a and 21b and the styluses 41a and 41b are not limited to the magnetic type and can be replaced with the optical type or any other type. Furthermore, the virtual object 43 is not limited to a CG model of the real object 42. The above-described processing can be similarly applied to any other virtual objects.

Instead of using the above-described HMD 20b, the instructor can use a stereoscopic display. In this case, the stereoscopic display can serve as the display unit 23b shown in FIG. 2B, which is placed in the instructor's space. When the display unit is a polarized light type or a liquid crystal shutter type, the instructor can wear the polarized light eyeglasses or the liquid crystal shutter eyeglasses instead of using the HMD.

Furthermore, according to a lenticular method, the instructor can observe a stereoscopic image without using any eyeglasses. Moreover, in any case, the display unit must be equipped with a three-dimensional position and orientation sensor to measure the position and orientation of the instructor's head.

According to the above-described exemplary embodiment, the instructor existing in a distant place can look at the mixed reality video by selecting a desirable one of plural camera viewpoints, including the worker's HMD camera viewpoint, to seamlessly perceive the worker's space. Accordingly, the instructor can give a three-dimensional work instruction to the worker.

Furthermore, plural participants existing in distant places can look at the mixed reality video by selecting a desirable one of the plural camera viewpoints to seamlessly perceive the worker's space. Accordingly, the plural participants existing in distant places can easily perform three-dimensional cooperation work.

Second Exemplary Embodiment

According to the first exemplary embodiment, the instructor can select a desirable viewpoint among the cameras set in the worker space and the worker's head mounted camera. However, the worker cannot immediately know the instructor's viewpoint. To solve this problem, the second exemplary embodiment enables the worker to confirm an identifier showing the instructor's viewpoint position.

More specifically, the instructor's pointer 41b can change its color depending on the camera viewpoint. For example, in FIG. 2A, when the viewpoint of the camera 70a is selected by the instructor, the instructor's pointer 41b turns into a green color. When the viewpoint of the camera 70b is selected, the instructor's pointer 41b turns into a blue color. When the worker's camera viewpoint is selected, the instructor's pointer 41b turns into a red color. With such settings, the worker can easily perceive the instructor's viewpoint.

The operation according to the second exemplary embodiment will be described in more detail. The camera management table of the first exemplary embodiment shown in FIG. 10 can be modified as shown in FIG. 11. The table of FIG. 11 includes an additional column that indicates the color information corresponding to respective cameras, so that the pointer 41b can change its color with reference to the color information of the table in response to the selection of the camera.

The management server 60 can accomplish the processing through the following processes. First, the management server 60 generates a color changing event (i.e., an event for changing the color of the pointer 41b) when a new camera is selected in step S530 shown in FIG. 5B. Then, the management server 60 changes the scene graph stored in the virtual object communication managing section 61. Then, the color changing event is transmitted to the worker mixed reality apparatus 10a.

As another method for enabling the worker to identify the instructor's viewpoint position, an avatar of the instructor's face or any other identifier can be displayed near the camera placed in the worker space or can be superimposed on this camera. According to this method, the worker can immediately confirm the instructor's viewpoint position when the worker turns his face toward the camera.

To realize the operation, when a new camera is selected in step S530, the management server 60 can transmit a CG creation event (i.e., an event for creating the CG of an identifier at or near the camera position) to the virtual object communication managing section 61 and to the worker mixed reality apparatus 10a.

The above processing can be easily realized, because the camera position is known beforehand in the world coordinate system of the worker space. Furthermore, to discriminate the identifier from other virtual objects, a specific attribute for prohibiting the manipulation of the identifier's CG can be assigned to the identifier.

Furthermore, in addition to the above-described processing, the management server 60 can transmit a CG deletion event (i.e., an event for deleting the CG displayed for a previous camera) to the virtual object communication managing section 61 and to the worker mixed reality apparatus 10a.

Displaying an appropriate identifier indicating the instructor's viewpoint in the worker space as described above enables the worker to easily perceive the instructor's viewpoint. As a result, the remote work efficiency can be improved.

Third Exemplary Embodiment

According to the first exemplary embodiment, only one instructor existing in a remote place can support a worker.

If the system can permit plural remote operators to share the worker's mixed reality space, the usability of the system can be further improved.

Figure 6A:
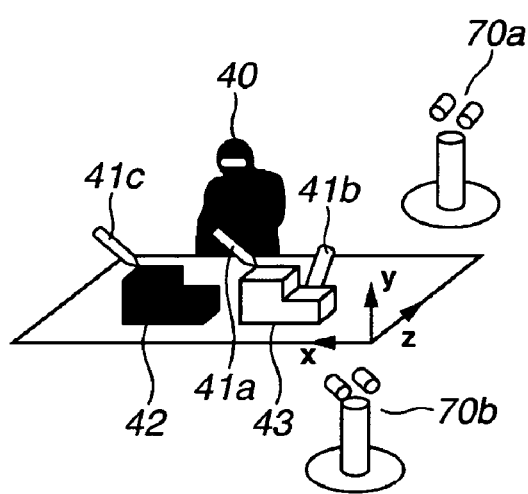
FIGS. 6A and 6B are exemplary views showing the state of a worker's mixed reality space and screen displays in plural remote participant mixed reality apparatuses in accordance with a third exemplary embodiment.
Figure 6B:
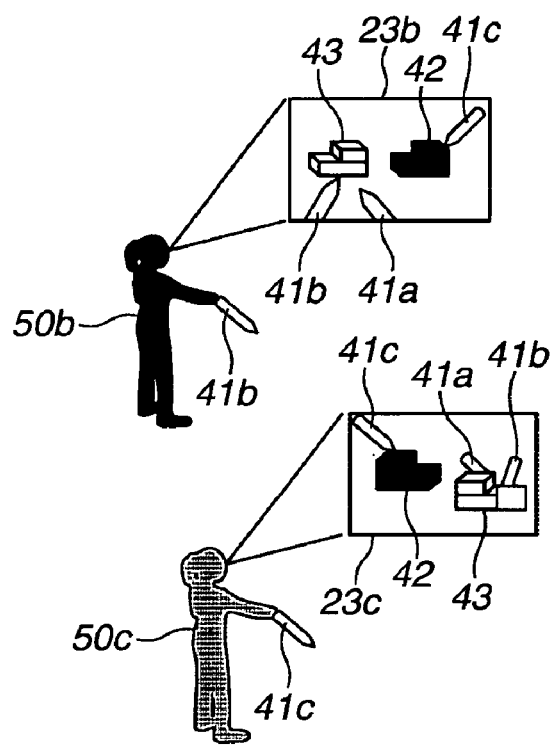

FIGS. 6A and 6B illustrate the concept of the third exemplary embodiment. The operation state of FIGS. 6A and 6B differs from that of FIGS. 2A, 2B, and 2C in that two remote participants 50b and 50c can share the worker's mixed reality space shown in FIG. 6A.

A pointer 41c of the remote participant 50c can be displayed in the worker's mixed reality space and can be shared by all participants. The remote participants 50b and 50c can respectively look the images displayed on the display units 23b and 23c shown in FIG. 6B. According to the example, the remote participant 50b is observing the worker's mixed reality space from the viewpoint of the camera 70a and the remote participant 50c is observing from the viewpoint of the camera 70b.

Similar to the first exemplary embodiment, the stylus of each remote participant includes first and second buttons (not shown). The first button can be used to hold or release a virtual object, while the second button can be used to switch the camera viewpoint position.

For example, in the condition of FIG. 6B, the remote participant 50b can switch the viewpoint position from the camera 70a to the camera 70b by depressing the second button of the stylus. Furthermore, the remote participant 50b can switch the viewpoint position from the camera 70b to the worker's camera by depressing again the second button of the stylus. Furthermore, the remote participant 50b can switch the viewpoint position from the worker's camera to the camera 70a by depressing again the second button of the stylus.

Similarly, the remote participant 50c can successively switch the viewpoint position by depressing the second button of the stylus. The remote participants can select the same viewpoint, although only one participant can be permitted to manipulate the virtual object.

Figure 7:
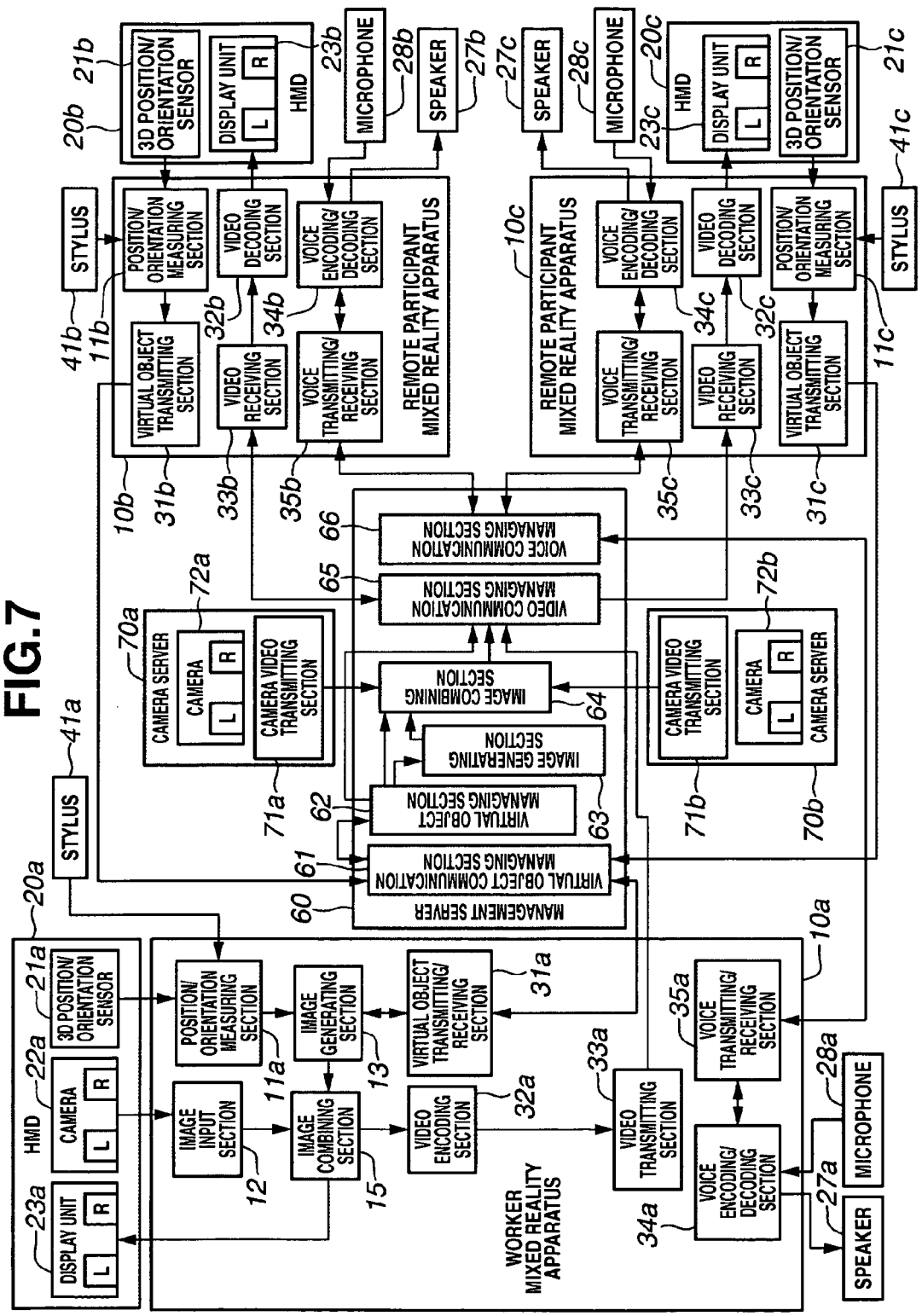
FIG. 7 is a block diagram showing the arrangement of a remote mixed reality sharing system in accordance with the third exemplary embodiment.

FIG. 7 illustrates a practical example of a remote mixed reality sharing system in accordance with the third exemplary embodiment. The arrangement shown in FIG. 7 includes two remote participant mixed reality apparatus 10b and 10c, each having the same arrangement as that of the instructor mixed reality apparatus 10b shown in FIG. 1.

The participant mixed reality apparatus 10b is not different from the instructor mixed reality apparatus 10b shown in FIG. 1 in the connection with the management server 60. The participant mixed reality apparatus 10c has a voice transmitting and receiving section 35c connected to the voice communication managing section 66 of the management server 60, a video receiving section 33c connected to the video communication managing section 65 of the management server 60, and a virtual object transmitting section 31c connected to the virtual object communication managing section 61 of the management server 60.

Although the example shows two remote participants, the total number of the remote participants can be increased by providing additional remote participant mixed reality apparatuses connected to the management server 60.

In the participant mixed reality apparatuses 10b and 10c and the worker mixed reality apparatus 10a, similar component sections or equipments are denoted by the same reference numerals with different suffixes, the description of which is, therefore, not repeated here.

The processing of the third exemplary embodiment will be described in comparison with the first exemplary embodiment. The processing relating to the worker mixed reality apparatus 10a is not different from the flowchart shown in FIG. 3. The processing relating to the remote participant mixed reality apparatuses 10b and 10c is not different from the flowchart shown in FIG. 4. The processing relating to the management server 60 is different from the flowcharts FIGS. 5A, 5B, and 5C because an increased number of remote apparatuses are connected to the management server 60.

Figure 8A:
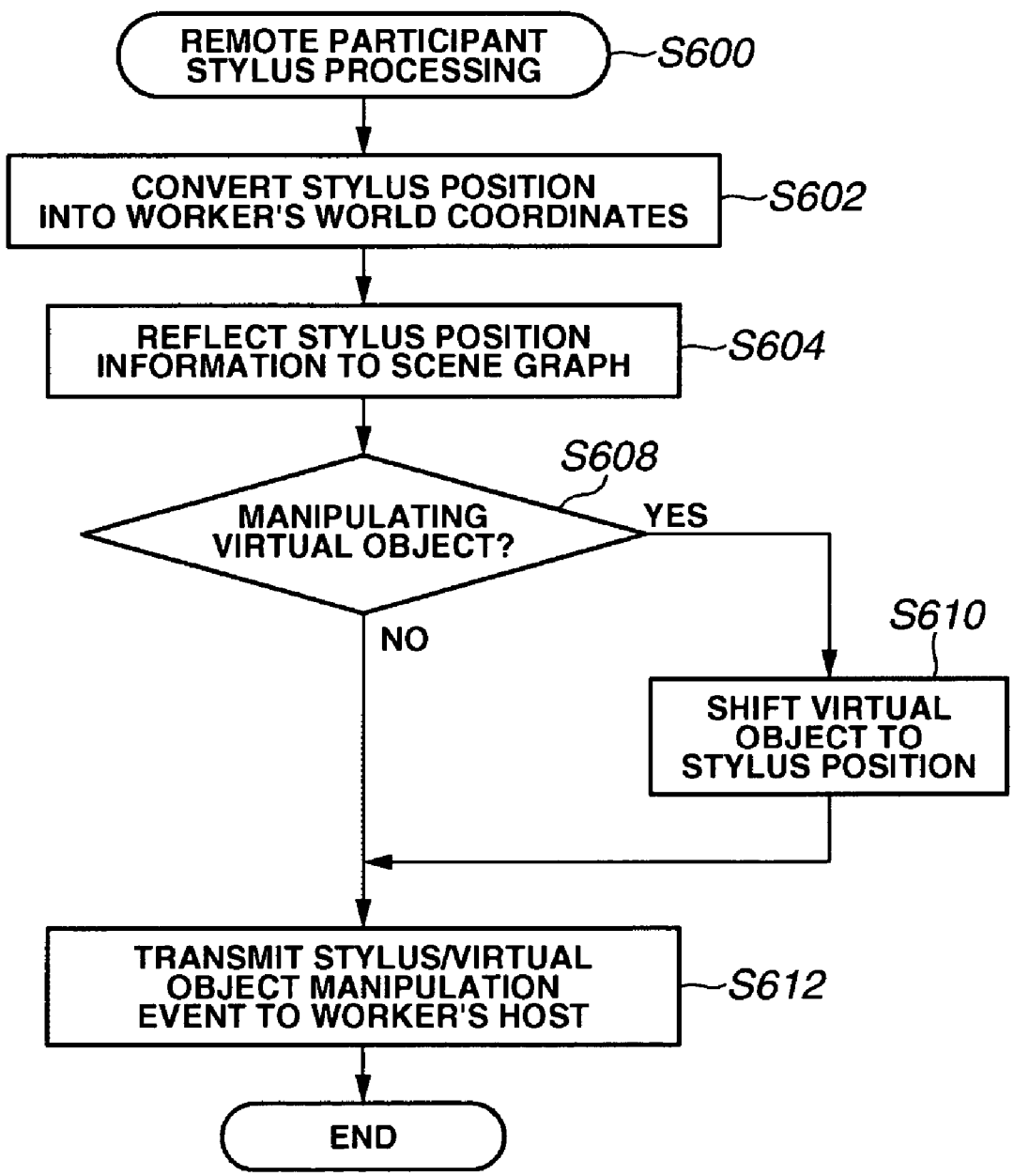
FIGS. 8A, 8B, and 8C are flowcharts showing part of reception event processing performed in a management server in accordance with the third exemplary embodiment.
Figure 8B:
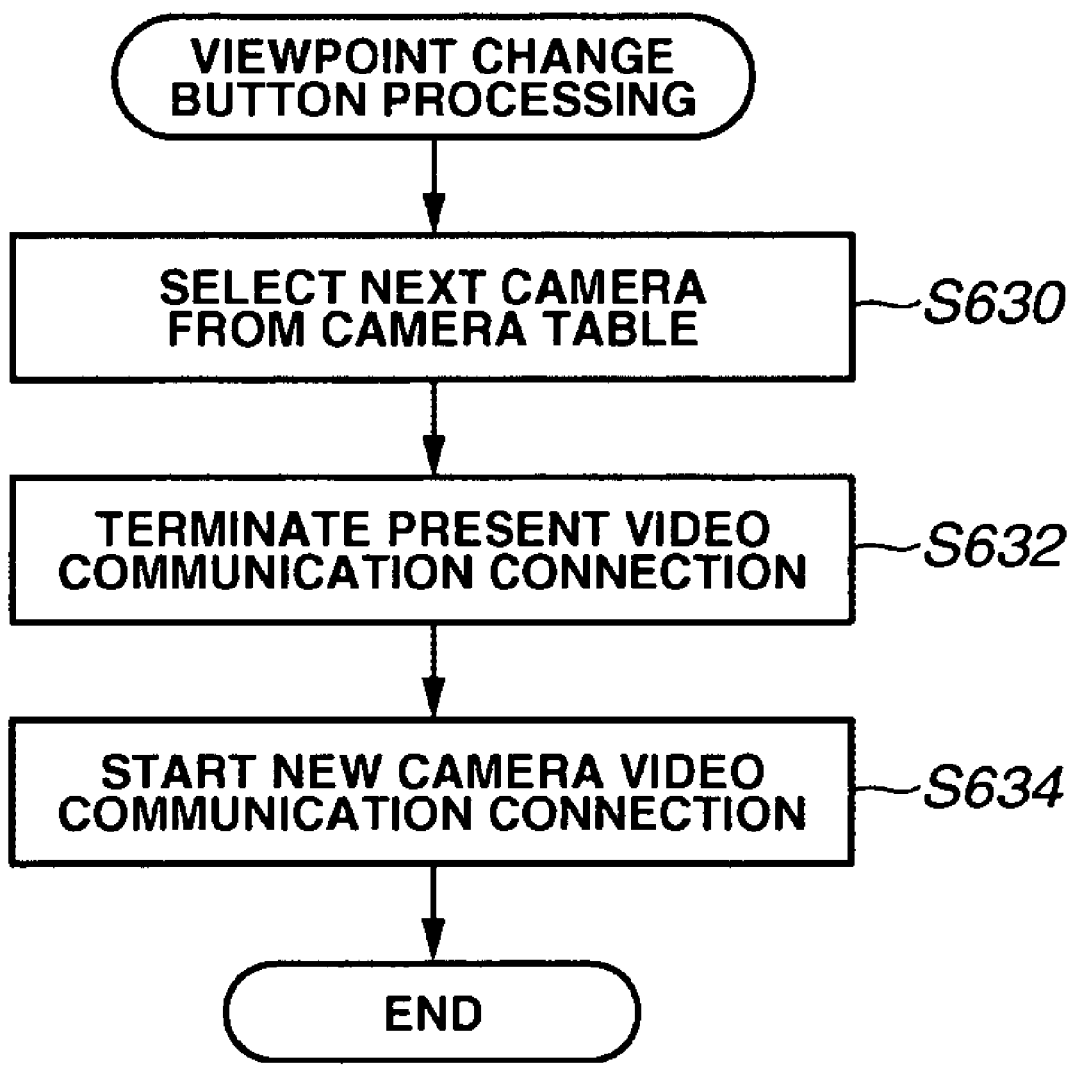
Figure 8C:
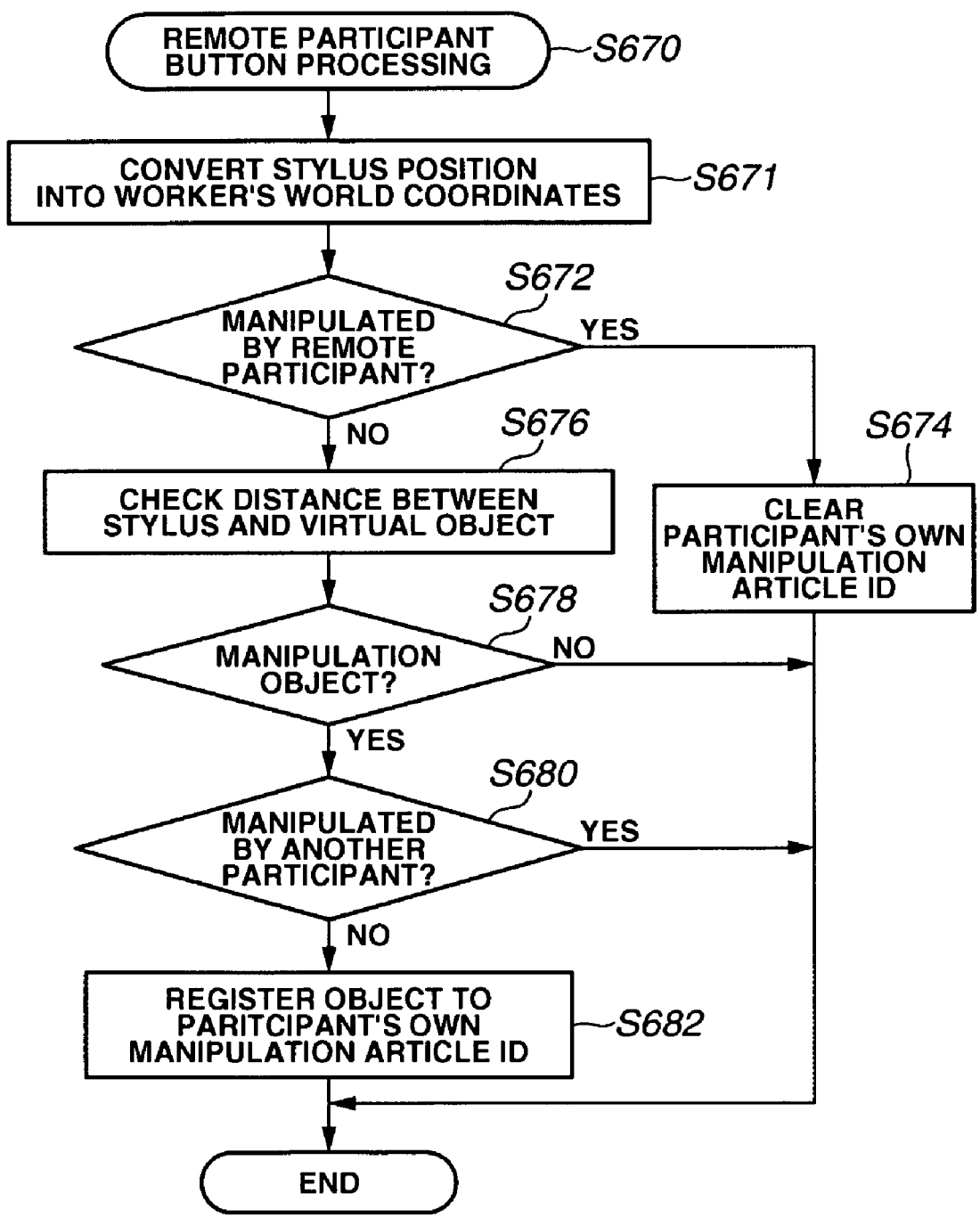

FIGS. 8A, 8B, and 8C are flowcharts showing part of the reception event processing performed in the management server 60 in accordance with the third exemplary embodiment.

The virtual object communication managing section 61 can receive the information relating to worker's stylus position and the remote participant's stylus position.

The processing for the worker's stylus position information is not different from the processing in the first exemplary embodiment. The management server 60 starts remote participant's stylus position event processing at step S600 of FIG. 8A.

In step S602, the management server 60 converts the relative position information of the remote participant's stylus seen from the participant's viewpoint into relative position information seen from the viewpoint of a selected camera. In this case, the viewpoint position of the selected camera can be obtained from the second column of FIG. 13.

In step S604, the management server 60 can reflect the remote participant's stylus information obtained in step S602 to the pointer information of the scene graph stored in the virtual object managing section 62. In step S608, it is determined whether the remote participant is presently manipulating a virtual object with the stylus, with reference to the virtual object management table shown in FIG. 12.

The virtual object management table is a matrix showing virtual objects that the worker and the remote participants are presently manipulating, together with the type of virtual objects listed in the first column and the worker and the remote participants shown in subsequent columns.

The management server 60 can use the virtual object management table to manage the participant's manipulation of virtual objects. According to the example of FIG. 12, a remote participant A is manipulating a virtual object I, and a remote participant B is manipulating a virtual object III. For each participant, an On Flag is put into the row of a virtual object that the participant is presently manipulating. Otherwise, null is stored in the cell. As understood from the table, each virtual object can be manipulated by only one participant.

According to the processing, the management server 60 checks the column of a remote participant that has transmitted a stylus position event. When there is any virtual object having On Flag (i.e., YES in step S608), the remote participant is presently manipulating the virtual object and the processing flow proceeds to step S610.

Otherwise, the remote participant is presently manipulating no virtual object and accordingly the processing flow proceeds to step S612. Instep S610, the management server 60 shifts the virtual object to the stylus position and changes the scene graph.

In step S612, the management server 60 transmits the stylus position and the virtual object manipulation event to the worker mixed reality apparatus 10a before terminating the processing of this routine.

FIG. 8B shows the viewpoint changing button event processing. When the remote participant depresses the second button of the stylus, this event can be received by the virtual object communication managing section 61 and sent to the virtual object managing section 62.

The camera management table of FIG. 13 shows plural camera viewpoints that the remote participant can select as a viewpoint for observing the mixed reality space. The table of FIG. 13 includes plural camera IDs listed in the first column. According to the example, there are a total of n cameras in addition to the worker's camera.

The second column of the table lists the positional data of camera viewpoints expressed by a data set of 6 parameters defined in the world coordinate system of the worker space. The third and succeeding columns of the table shows the state of "Flag" that indicates the camera presently providing the viewpoint for the remote participants. According to the example, a remote participant B is observing from the viewpoint of the camera I and a remote participant C is observing from the viewpoint of the camera n.

If the remote participant B depresses the second button of the stylus in this condition, On Flag shifts from the camera I to the camera II.

In this manner, every time the button is depressed, the remote participant's viewpoint camera can be successively changed (selected) in the order shown in the table of FIG. 13. According to this order, the worker's camera can be finally selected and then the camera I can be selected again.

In step S630, as described above, the On Flag shifts from the presently selected camera to the next camera. In the next step S632, the virtual object managing section 62 sends a termination command to the video communication managing section 65 to terminate the present video connection. The video communication managing section 65 then disconnects the video communications.

In step S634, the video communication managing section 65 starts a new connection of video communications with reference to the camera management table shown in FIG. 13. When the camera having On Flag is a camera of the camera server, the image signal of the selected camera can be entered into the image combining section 64.

When the camera having the On Flag is the worker's camera, no image signal can be entered from the image combining section 64 to the video communication managing section 65. Instead, the output of the worker mixed reality apparatus 10a can be transmitted from the voice communication managing section 66 to the corresponding remote participant mixed reality apparatus 10b before terminating the processing of this routine. In this manner, the remote participant can look at the mixed reality video by switching the viewpoint.

FIG. 8C is a flowchart showing processing of remote (instructor) button presses. The processing begins in step S670 when pressing of a remote button is detected. In step S671 of the instructor's button event processing shown in FIG. 8C, the management server 60 converts the remote participant's stylus position into the worker's world coordinates, by performing the processing similar to that of the step S602 of FIG. 8A. The virtual object managing section 62 stores the converted remote participant's stylus position.

In step S672, it is determined whether the remote participant having transmitted the button event is presently manipulating any virtual object, by checking the remote participant manipulation article ID shown in FIG. 12. When there in no On Flag (i.e., NO in step S672), the remote participant is presently manipulating no virtual object and accordingly the processing flow proceeds to step S676. When there is an On Flag (i.e., YES in step S672), the remote participant is presently manipulating a virtual object and accordingly the processing flow proceeds to step S674.

In step S674, the management server 60 rewrites the column of the corresponding remote participant shown in FIG. 12 to null and terminates the processing of this routine. In step S676, to obtain a distance, the management server 60 compares the present remote participant's stylus position stored in the virtual object managing section 62 with the positions of all virtual objects existing in the worker's mixed reality space.

In step S678, it is determined based on the comparison result whether there is any virtual object within a predetermined distance (i.e., whether the distance is within a threshold). When there is any virtual object (i.e., YES in step S678), the virtual object (e.g., a closest one in the case of plural virtual objects) is identified as a manipulation object and the processing flow proceeds to step S680. Otherwise, the management server 60 terminates the reception event processing.

In step S680, it is determined whether the manipulation object ID obtained in step S678 agrees with any manipulation article ID shown in FIG. 12. When there is any On Flag in the row of the virtual manipulation object (i.e., YES in step S680), another participant is presently manipulation the identified virtual object and the management server 60 terminates the reception event processing.

When there is no On Flag in the row of the virtual manipulation object (i.e., NO instep S680), the processing flow proceeds to step S682. In step S682, the management server 60 assigns the manipulation object ID obtained in step S678 into On Flag in the table of FIG. 12 before terminating the remote participant button processing. Through the above-described processing, plural remote participants can observe the worker's mixed reality space from plural viewpoints and can point or manipulate a shared virtual object.

Fourth Embodiment

According to the third exemplary embodiment, the remote participant can select a desirable viewpoint among the cameras set in the worker space and the worker's head mounted camera. However, the worker cannot immediately know the remote participant's viewpoint. To solve this problem, the fourth exemplary embodiment enables the worker to confirm an identifier showing the remote participant's viewpoint position.

To this end, an avatar of the remote participant's face or any other identifier can be displayed near the camera placed in the worker space or can be superimposed on this camera. According to this method, the worker can immediately confirm the remote participant's viewpoint position when the worker turns their face toward the camera.

To realize the operation, when a new camera is selected in step S630, the management server 60 can transmit a CG creation event (i.e., an event for creating the CG of an identifier at or near the camera position) to the virtual object communication managing section 61 and to the worker mixed reality apparatus 10a.

The above processing can be easily realized, because the camera position is known beforehand in the world coordinate system of the worker space.

Furthermore, to discriminate the identifier from other virtual objects, a specific attribute for prohibiting the manipulation of the identifier's CG can be assigned to the identifier.

Furthermore, in addition to the above-described processing, the management server 60 can transmit a CG deletion event (i.e., an event for deleting the CG displayed for a previous camera) to the virtual object communication managing section 61 and to the worker mixed reality apparatus 10a.

Displaying an appropriate identifier indicating the remote participant's viewpoint in the worker space as described above enables not only the worker but also the remote participant(s) to easily perceive another participant's viewpoint. As a result, the remote work efficiency can be improved.

As an alternative to the CG of a face, the identifier can be text data representing another participant's name or a color identifier. When plural remote participants share the same camera viewpoint, their identifiers should be displayed in a way that discriminates one from the other.

Fifth Exemplary Embodiment

According to the third exemplary embodiment, the stereo cameras are fixed in the worker space. However, the stereo cameras can be moveable, for example to allow panning and tilting motions, or can be mounted on a vehicle. In this case, the viewpoint position and orientation of a moving camera can be measured in real time with a three-dimensional position and orientation sensor attached to the camera.

Operation identical with that of the third exemplary embodiment can be realized by momentarily measuring the camera position and orientation during the operation of the camera and storing the measured result (i.e., camera viewpoint position coordinates) in the table of FIG. 12.

When any input device is required for a remote participant to shift and control the camera, a joystick or another comparable device can be provided on the stylus for that purpose.

Furthermore, to avoid the collision of camera manipulation requests from plural participants, the management server 60 or the camera servers 70a and 70b should have a manipulation right managing function based on well-known techniques.

As described above, plural remote participants can observe the worker's mixed reality space from the viewpoints of plural cameras, and also control the viewpoint position and orientation from a distant place. Thus, an improved remote cooperation work supporting system can be realized.

The present invention can also be achieved by providing a system or device with a storage medium that stores program code (software) for implementing the functions of the above-described embodiments, and causing a computer (or a CPU, MPU or the like) of the system or device to read the program code from the storage medium and then to execute the program code.

In this case, the program code itself read from the storage medium realizes the functions of the embodiments.

The storage medium for providing the program code may include, for example, a ROM, a flexible disk, a hard disk, an optical disk, a magneto-optical disk, a CD-ROM, a CD-R, a magnetic tape, a non-volatile memory card, etc.

Furthermore, besides the program code read by the computer being executed to realize the functions of the above-described embodiments, the present invention includes an OS (operating system) or the like running on the computer performing an actual process in whole or in part according to instructions of the program code to realize the functions of the above-described embodiments.

If the present invention is applied to the above program or a storage medium storing the program, the program includes, for example, program code corresponding to the flow of processing shown in FIGS. 3, 4, 5A-5C and 8A-8C and described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-112108 filed Apr. 8, 2005, which is hereby incorporated by reference herein in its entirety.

What is claimed is:

1. An information processing method for enabling a further user to share a mixed reality space image including a virtual object superimposed in a space where a first user exists, comprising:

a first image acquiring step of obtaining a first stereo image based on stereo video data from a first stereo capturing section mounted on the first user and a virtual object image created based on the position and orientation of the first stereo capturing section;

a second image acquiring step of obtaining a second stereo image based on stereo video data from a second stereo capturing section provided in the space where the first user exists and a virtual object image created based on the position and orientation of the second stereo capturing section;

a selecting step of selecting an image from the first stereo image and the second stereo image according to an instruction of the further user;

a displaying step of displaying the selected image to the further user;

a manipulation object position acquiring step of obtaining the position of a manipulation object manipulated by the further user;

a further user position and orientation acquiring step of obtaining the position and orientation of the further user;

a relative position information acquiring step of obtaining relative position information representing the position of the manipulation object relative to the position and orientation of the further user;

a producing step of producing a manipulation object virtual image based on the position and orientation of the first stereo capturing section, with reference to the relative position information of the manipulation object and the position and orientation of one of the first and second stereo capturing sections corresponding to the selected image;

a combining step of combining the manipulation object virtual image with the first stereo image to create a composite image; and a displaying step of displaying the composite image to the first user.

2. An information processing method for enabling a further user to share a mixed reality space image including a virtual object superimposed in a space where a first user exists, comprising:

a first image acquiring step of obtaining a first stereo image based on stereo video data from a first stereo capturing section mounted on the first user and a virtual object image created based on the position and orientation of the first stereo capturing section;

a second image acquiring step of obtaining a second stereo image based on stereo video data from a second stereo capturing section provided in the space where the first user exists and a virtual object image created based on the position and orientation of the second stereo capturing section;

a selecting step of selecting an image from the first stereo image and the second stereo image according to an instruction of the further user;

a displaying step of displaying the selected image to the further user;

a manipulation object position acquiring step of obtaining the position of a manipulation object manipulated by the further user;

a further user position and orientation acquiring step of obtaining the position and orientation of the further user;

a relative position information acquiring step of obtaining relative position information representing the position of the manipulation object relative to the position and orientation of the further users;

an identification image producing step of producing an identification image representing the selected image;

an identification image combining step of combining the identification image with the first stereo image to create a composite image; and a displaying step of displaying the composite image created in the identification image combining step to the first user.

3. The information processing method according to claim 2, wherein the identification image is a virtual image of the manipulation object, and a color of the virtual image of the manipulation object changes depending on the selected image.

4. An information processing apparatus that enables a further user to share a mixed reality space image including a virtual object superimposed in a space where a first user exists, comprising:

a first image acquiring unit configured to obtain a first stereo image based on stereo video data from a first stereo capturing section mounted on the first user and a virtual object image created based on the position and orientation of the first stereo capturing section;

a second image acquiring unit configured to obtain a second stereo image based on stereo video data from a second stereo capturing section provided in the space where the first user exists and a virtual object image created based on the position and orientation of the second stereo capturing section;

a selecting unit configured to select an image from the first stereo image and the second stereo image according to an instruction of the further user;

a display unit configured to display the selected image to the further user;

a manipulation object position acquiring unit configured to obtain the position of a manipulation object manipulated by the further user;

a further user position and orientation acquiring unit configured to obtain the position and orientation of the further user;

a relative position information acquiring unit configured to obtain relative position information representing the position of the manipulation object relative to the position and orientation of the further user;

a producing unit configured to produce a manipulation object virtual image based on the position and orientation of the first stereo capturing section, with reference to the relative position information of the manipulation object and the position and orientation of one of the first and second stereo capturing sections corresponding to the selected image;

a combining unit configured to combine the manipulation object virtual image with the first stereo image to create a composite image; and a displaying unit configured to display the composite image to the first user.

5. A computer-readable medium having stored thereon a computer program which, when loaded into an information processing apparatus and executed, performs an information processing method according to claim 1.

* * * * *